United States Patent

Fett

[11] Patent Number: 6,123,175
[45] Date of Patent: Sep. 26, 2000

[54] INTERCONNECTED VENTS FOR MOTOR VEHICLE AXLE ASSEMBLY

[75] Inventor: Gregory A. Fett, Fort Wayne, Ind.

[73] Assignee: Dana Corporation, Toledo, Ohio

[21] Appl. No.: 09/136,193

[22] Filed: Aug. 19, 1998

[51] Int. Cl.⁷ .................................................. F16N 17/06
[52] U.S. Cl. .............................. 184/59; 184/6.23; 74/607
[58] Field of Search ................................. 74/606 R, 607; 184/59, 6.21, 6.23, 6.12, 1.5

[56] References Cited

U.S. PATENT DOCUMENTS

| | | | |
|---|---|---|---|
| 498,589 | 5/1893 | Travis . | |
| 4,557,526 | 12/1985 | Smith | 301/124 R |
| 5,062,447 | 11/1991 | Davison, Jr. et al. | 74/606 R |
| 5,129,422 | 7/1992 | Davison, Jr. et al. | 74/606 R |
| 5,316,106 | 5/1994 | Baedke et al. | 184/6.12 |
| 5,509,949 | 4/1996 | Gluys et al. | 74/606 R |
| 5,540,300 | 7/1996 | Downs et al. | 184/11.2 |
| 5,724,864 | 3/1998 | Rodgers et al. | 74/606 R |

*Primary Examiner*—David M. Fenstermacher
*Attorney, Agent, or Firm*—Oldham & Oldham Co., L.P.A.

[57] ABSTRACT

Interconnected vents for a motor vehicle axle assembly, transmission or transfer case which interconnects multiple vents at different locations together with another vent positioned at the highest point the lubricant travels. This allows the lubricant to flow out of one vent and return to the other vent without leaking onto the ground. Such an interconnected vent arrangement will minimize the extent of external lubricant leakage due to such factors as foaming of the lubricant, air entrapment in the lubricant, volumetric expansion of the lubricant due to elevated operating temperatures, pumping or splashing of the lubricant by internal rotating or moving parts, flow of the lubricant due to tilting of the motor vehicle, and thus the motor vehicle axle assembly, transmission and transfer case, and/or acceleration or deceleration of the motor vehicle.

7 Claims, 1 Drawing Sheet

6,123,175

INTERCONNECTED VENTS FOR MOTOR VEHICLE AXLE ASSEMBLY

BACKGROUND AND SUMMARY OF THE INVENTION

The present invention relates generally to new and novel interconnected vents for a motor vehicle axle assembly, transmission or transfer case. More particularly, the present invention relates to new and novel interconnected vents for a motor vehicle axle assembly, transmission or transfer case which captures, retains and returns lubricant to the motor vehicle axle assembly, transmission or transfer case and precludes lubricant from flowing out of a vent onto the ground.

During operation, the lubricant in motor vehicle axle assemblies, transmissions and transfer cases generally becomes warmer and, therefore, expands. If no vent is provided in the motor vehicle axle assembly, transmission or transfer case, such lubricant expansion can cause a significant pressure increase and undesirable consequences. Furthermore, when operation of the motor vehicle axle assembly, transmission or transfer case ends, the lubricant will cool, thus creating a pressure decrease in the motor vehicle axle assembly, transmission or transfer case cavity.

Accordingly, a vent in an upper portion of the motor vehicle axle assembly, transmission or transfer case cavity is normally provided to equalize the pressure in the motor vehicle axle assembly, transmission or transfer case cavity with the outside environment. However, such vents do not generally preclude lubricant from flowing out of, or leaking from, the motor vehicle axle assembly, transmission or transfer case cavity onto the ground. This is particularly the case when the lubricant expands in volume due to, for example, foaming of the lubricant, air being retained in the lubricant, volumetric expansion of the lubricant due to elevated operating temperatures, pumping or splashing of the lubricant resulting from internal rotating or moving parts, flow of the lubricant due to tilting of the motor vehicle, and thus the motor vehicle axle assembly, transmission and transfer case, and/or acceleration or deceleration of the motor vehicle.

A preferred embodiment of the present invention is, therefore, directed to interconnected vents for a motor vehicle axle assembly, transmission or transfer case which interconnects multiple vents at different locations together with another vent positioned at the highest point the lubricant travels. This allows lubricant to flow out of one vent and return to the other vent without leaking onto the ground. Such an interconnected vent arrangement will minimize the extent of external lubricant leakage due to such factors as foaming of the lubricant, air entrapment in the lubricant, volumetric expansion of the lubricant due to elevated operating temperatures, pumping or splashing of the lubricant by internal rotating or moving parts, flow of the lubricant due to tilting of the motor vehicle, and thus the motor vehicle axle assembly, transmission and transfer case, and/or acceleration or deceleration of the motor vehicle.

Other advantages and novel features of the present invention will become apparent in the following detailed description of the invention when considered in conjunction with the accompanying drawings.

DETAILED DESCRIPTION OF THE DRAWINGS

Figure 1:
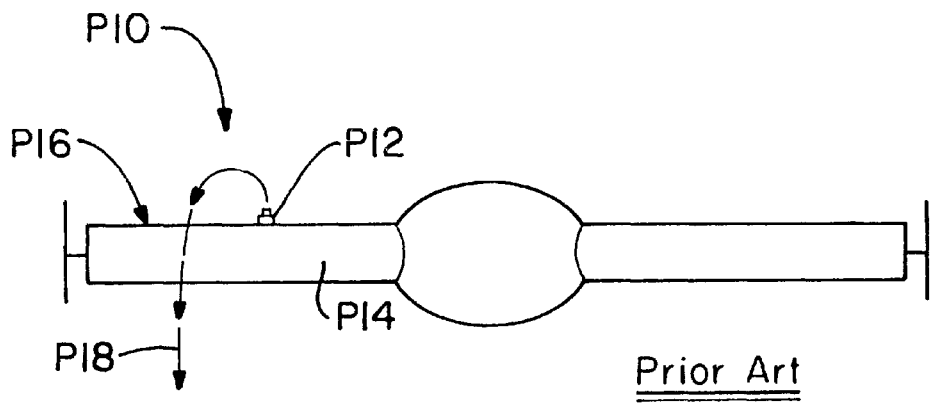
FIG. 1 is a rear view of a representative prior art vent in a motor vehicle axle assembly.

In the following detailed description of a preferred embodiment of the present invention, reference is made to the accompanying drawings which, in conjunction with this detailed description, illustrate and describe a preferred embodiment of interconnected vents for a motor vehicle axle assembly, transmission or transfer case, generally identified by reference number 10, in accordance with the present invention. Referring now to the drawings, attention is first directed to FIG. 1, which illustrates a rear view of a representative prior art vent in a motor vehicle axle assembly, generally identified by reference number P10. As seen in FIG. 1, vent P12 is connected to cavity P14 in motor vehicle axle assembly P16 and allows lubricant P18 to flow out of, and leak onto the ground due to such factors as foaming of lubricant P18, air entrapment in lubricant P18, volumetric expansion of lubricant P18 due to elevated operating temperatures, pumping or splashing of lubricant P18 by internal rotating or moving parts, flow of lubricant P18 due to tilting of the motor vehicle, and thus the motor vehicle axle assembly, and/or acceleration or deceleration of the motor vehicle.

Figure 2:
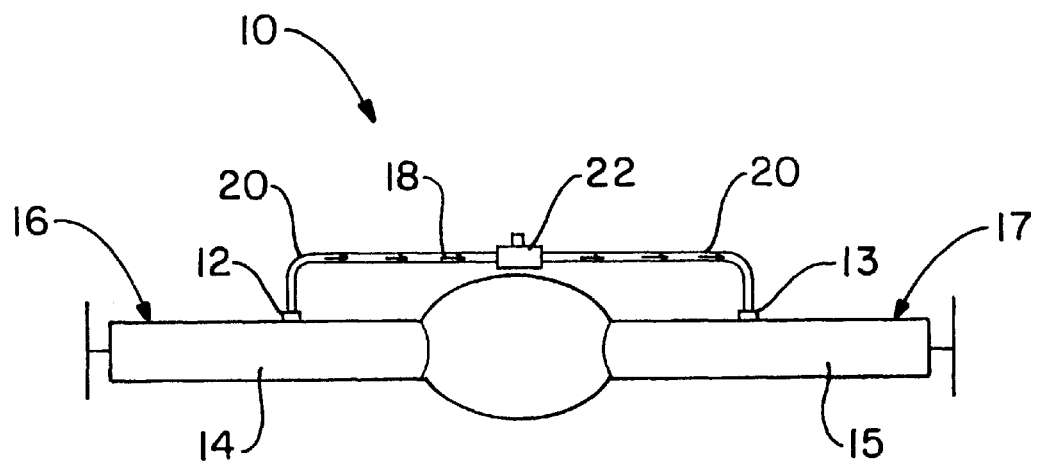
FIG. 2 is a rear view of interconnected vents for a motor vehicle axle assembly, transmission or transfer case in accordance with a preferred embodiment of the present invention shown in a motor vehicle axle assembly environment.

Referring now to FIG. 2, which illustrates a rear view of interconnected vents for a motor vehicle axle assembly, transmission or transfer case 10 in accordance with a preferred embodiment of the present invention shown in a motor vehicle axle assembly environment, interconnected vents for motor vehicle axle assembly, transmission or transfer case 10 include first vent 12 connected to cavity 14 of first side 16 of the motor vehicle axle assembly and second vent 13 connected to cavity 15 of second side 17 of the motor vehicle axle assembly. In such an arrangement of interconnected vents for motor vehicle axle assembly, transmission or transfer case 10, lubricant 18 which flows out of, or leaks from, first vent 12 due to such factors as foaming of lubricant 18, air entrapment in lubricant 18, volumetric expansion of lubricant 18 due to elevated operating temperatures, pumping or splashing of lubricant 18 by internal rotating or moving parts, flow of lubricant 18 due to tilting of the motor vehicle, and thus the motor vehicle axle assembly, transmission and transfer case, and/or acceleration or deceleration of the motor vehicle is captured and retained in interconnecting tube 20, one end of which is attached, either removably or permanently, to first vent 12. Lubricant 18 then flows through interconnecting tube 20, the opposite end of which is attached, either removably or permanently, to second vent 13, into second vent 13 and thus into cavity 15 of second side 17 of the motor vehicle axle assembly. Interconnecting tube 20 thus precludes lubricant 18 from flowing out of, or leaking from, the motor vehicle axle assembly, transmission or transfer case onto the ground. Vent 22 in interconnecting tube 20 allows the pressure in cavity 14 of first side 16 of the motor vehicle axle assembly and cavity 15 of second side 17 of the motor vehicle axle assembly to be equalized with the outside environment.

On the other hand, if lubricant 18 flows out of, or leaks from, second vent 13 due to such factors as foaming of lubricant 18, air entrapment in lubricant 18, volumetric expansion of lubricant 18 due to elevated operating temperatures, pumping or splashing of lubricant 18 by internal rotating or moving parts, flow of lubricant 18 due to tilting of the motor vehicle, and thus the axle assembly, transmission and transfer case, and/or acceleration or deceleration of the motor vehicle, lubricant 18 is captured and retained in interconnecting tube 20. Lubricant 18 then flows through interconnecting tube 20 into first vent 12 and into cavity 14 of first side 16 of the motor vehicle axle assembly. Thus, again, lubricant 18 does not leak out of the motor vehicle axle assembly, transmission or transfer case onto the ground. Vent 22 in interconnecting tube 20 allows the pressure in cavity 14 of first side 16 of the motor vehicle axle assembly and cavity 15 of second side 17 of the motor vehicle axle assembly to be equalized with the outside environment.

If lubricant 18 is simultaneously flowing from both first vent 12 and second vent 13 due to such factors as foaming of lubricant 18, air entrapment in lubricant 18, volumetric expansion of lubricant 18 due to elevated operating temperatures, pumping or splashing of lubricant 18 by internal rotating or moving parts, flow of lubricant 18 due to tilting of the motor vehicle, and thus the axle assembly, transmission or transfer case, and/or acceleration or deceleration of the motor vehicle, a predetermined volume of lubricant 18 is captured and retained in interconnecting tube 20 and is thus is precluded from leaking onto the ground. If this predetermined volume is exceeded, vent 22 will permit the excess lubricant 18 to leak onto the ground. The predetermined volume of lubricant 18 retained in interconnecting tube 20 can be established, as desired, by adjusting such factors as the cross-sectional area, configuration and length of interconnecting tube 20.

In the preferred embodiment of interconnected vents for a motor vehicle axle assembly, transmission or transfer case 10 described and shown herein, first vent 12, second vent 13 and vent 22 are preferably fittings fabricated from a metallic or plastic material. Interconnecting tube 20 is preferably fabricated from a resilient flexible material, most preferably a hose fabricated from rubber or some other polymeric material. However, it will be readily recognized by those having ordinary skill in the relevant art that other materials may be used to fabricate first vent 12, second vent 13, interconnecting tube 20 and second vent 22, including metallic materials such as steel, copper or aluminum, plastic materials and/or other polymeric or composite materials. Interconnecting tube 20 is preferably attached to first vent 12 and second vent 13 either by a removable attachment, such as a fitting having an O-ring seal, or a permanent attachment, such as a welded, brazed or adhesive joint.

Although the present invention has been described above in detail, the same is by way of illustration and example only and is not to be taken as a limitation on the present invention. For example, although interconnected vents for a motor vehicle axle assembly, transmission or transfer case 10 have been described and illustrated in a motor vehicle axle assembly environment, it will be apparent to those having ordinary skill in the art that such an arrangement could also be utilized in other motor vehicle applications, such as transmissions and transfer cases. In addition, although interconnecting tube 20 has been shown connecting first vent 12 and second vent 13, it will be recognized to those having ordinary skill in the relevant art that three (3) or more vents could be connected using an interconnecting tube by utilizing the teachings present in the present invention. Accordingly, the scope and content of the present invention are to be defined only by the terms of the appended claims.

What is claimed is:

1. An interconnecting vent for a motor vehicle axle assembly, the motor vehicle axle assembly including a first side axle having a cavity with lubricant therein and a first vent in an upper portion thereof and a second side axle having a cavity with lubricant therein and a second vent in an upper portion thereof, said interconnecting vent comprising:

an interconnecting tube having a first end and a second end, said first end of said interconnecting tube is adapted for attachment to the first vent in the cavity of the first side axle of the motor vehicle axle assembly and said second end of said interconnecting tube is adapted for attachment to the second vent in the cavity of the second side axle of the motor vehicle axle assembly, said interconnecting tube is adapted to be in communication with and capture and retain lubricant flowing from one or more of the first vent and the second vent; and a vent positioned in an upper portion of said interconnecting tube which is in communication with the outside environment and which is adapted to act to equalize the pressure in the cavity of the first side axle of the motor vehicle axle assembly and the pressure in the cavity of the second side axle of the motor vehicle axle assembly with the outside environment.

2. The interconnecting vent for a motor vehicle axle assembly in accordance with claim 1, wherein said first end of said interconnecting tube is capable of being removably attached to the first vent in the cavity of the first side axle of the motor vehicle axle assembly and said second end of said interconnecting tube is capable of being removably attached to the second vent in the cavity of the second side axle of the motor vehicle axle assembly.

3. The interconnecting vent for a motor vehicle axle assembly in accordance with claim 1, wherein said first end of said interconnecting tube is capable of being permanently attached to the first vent in the cavity of the first side axle of the motor vehicle axle assembly and said second end of said interconnecting tube is capable of being permanently attached to the second vent in the cavity of the second side axle of the motor vehicle axle assembly.

4. The interconnecting vent for a motor vehicle axle assembly in accordance with claim 1, wherein said vent positioned in said upper portion of said interconnecting tube is positioned at the highest point the lubricant travels.

5. The interconnecting vent for a motor vehicle axle assembly in accordance with claim 1, wherein said interconnecting tube is fabricated from a flexible resilient polymeric material.

6. The interconnecting vent for a motor vehicle axle assembly in accordance with claim 1, wherein said interconnecting tube is capable of being positioned substantially above the first vent in the cavity of the first side axle of the motor vehicle axle assembly and the second vent in the cavity of the second side axle of the motor vehicle axle assembly.

7. The interconnecting vent for a motor vehicle axle assembly in accordance with claim 1, wherein said interconnecting tube is capable of being positioned entirely above the first vent in the cavity of the first side axle of the motor vehicle axle assembly and the second vent in the cavity of the second side axle of the motor vehicle axle assembly.

* * * * *